United States Patent
Allen (10) Patent No.: US 10,019,567 B1
(45) Date of Patent: Jul. 10, 2018

(54) ENCODING OF SECURITY CODES (71) Applicant: Amazon Technologies, Inc., Reno, NV (US)

(72) Inventor: Nicholas Alexander Allen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 167 days.

(21) Appl. No.: 14/223,399

(22) Filed: Mar. 24, 2014

(51) Int. Cl.
 *G06F 7/04* (2006.01)
 *G06F 21/45* (2013.01)
(52) U.S. Cl.
 CPC .................................. *G06F 21/45* (2013.01)
(58) Field of Classification Search
 CPC ........................................................ G06F 21/45
 USPC ....................................................... 726/18, 19
 See application file for complete search history.

(56) References Cited

U.S. PATENT DOCUMENTS

| | | | | |
|---|---|---|---|---|
| 6,199,173 | B1* | 3/2001 | Johnson | G06F 1/206 714/3 |
| 6,611,598 | B1* | 8/2003 | Hayosh | G06Q 20/042 380/54 |
| 7,431,202 | B1* | 10/2008 | Meador | G06Q 20/32 235/379 |
| 7,882,036 | B1* | 2/2011 | Yankloski | G07B 17/00508 705/401 |
| 9,419,852 | B1* | 8/2016 | Heller | H04L 29/08576 |
| 2002/0046341 | A1* | 4/2002 | Kazaks | G06Q 20/04 713/182 |
| 2004/0078340 | A1* | 4/2004 | Evans | G06Q 20/10 705/64 |
| 2004/0153786 | A1* | 8/2004 | Johnson | G06F 1/26 714/25 |
| 2004/0185827 | A1* | 9/2004 | Parks | H04M 15/00 455/406 |
| 2007/0034685 | A1* | 2/2007 | Botham | G06Q 20/32 235/380 |
| 2008/0077794 | A1* | 3/2008 | Arnold | H04L 9/0822 713/169 |
| 2008/0191909 | A1* | 8/2008 | Mak | B64F 1/368 341/95 |
| 2009/0125976 | A1* | 5/2009 | Wassermann | G06F 8/00 726/1 |
| 2009/0158030 | A1* | 6/2009 | Rasti | H04L 63/0421 713/156 |
| 2011/0219427 | A1* | 9/2011 | Hito | G06F 21/00 726/3 |

(Continued)

OTHER PUBLICATIONS

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

(Continued)

*Primary Examiner* — Thu Ha Nguyen
(74) *Attorney, Agent, or Firm* — Davis Wright Tremaine LLP

(57) ABSTRACT

A method and apparatus for encoding security codes are provided. In the method and apparatus a first code, which may be an erroneous code, is compared to a set of codes to identify a code portion. The code portion may be identified as contributing to inducing erroneous entry of the first code. The likelihood associated with issuing a second code including the code portion may be updated to negatively bias issuing the second code.

22 Claims, 8 Drawing Sheets

Valid Codes:

[AAVV12^7;]
[AAVV!2^7;]
[ASW12^7;]

→ Validation Entity ← Request to Validate [AAW12^7;]  102

110

Undesirable Code Constructions:

W12
AAW
VV1
VV!
ASW

User Device

(56) References Cited

U.S. PATENT DOCUMENTS

| | | | | |
|---|---|---|---|---|
| 2012/0048941 | A1* | 3/2012 | Wang | G06K 7/1404 235/462.22 |
| 2012/0138688 | A1* | 6/2012 | Young | A63F 3/0655 235/488 |
| 2013/0036476 | A1* | 2/2013 | Roever | H04L 63/08 726/27 |
| 2014/0074719 | A1* | 3/2014 | Gressel | G06Q 20/3827 705/64 |
| 2014/0231512 | A1* | 8/2014 | Onischuk | G07C 13/00 235/386 |
| 2014/0249908 | A1* | 9/2014 | Staines | G06Q 30/0225 705/14.26 |
| 2014/0365281 | A1* | 12/2014 | Onischuk | G07C 13/00 705/12 |
| 2015/0163060 | A1* | 6/2015 | Tomlinson | H04L 9/304 380/30 |
| 2015/0237112 | A1* | 8/2015 | Landsman | H04L 67/06 709/203 |
| 2015/0302374 | A1* | 10/2015 | Sartor | G06Q 20/02 705/16 |
| 2015/0355836 | A1* | 12/2015 | Gummadidala | G06F 3/04886 715/773 |
| 2016/0019396 | A1* | 1/2016 | Davis | G06F 21/6209 713/193 |
| 2016/0021093 | A1* | 1/2016 | Vinckier | G06F 21/34 726/9 |
| 2016/0062954 | A1* | 3/2016 | Ruff | G06F 17/21 715/249 |
| 2016/0093131 | A1* | 3/2016 | Schuette | G07C 9/00674 726/3 |
| 2016/0357731 | A1* | 12/2016 | Zorzin | G06F 17/2785 |

OTHER PUBLICATIONS

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

* cited by examiner

ENCODING OF SECURITY CODES

BACKGROUND

Security codes are often used in user interactions with security systems, whereby the security system may require manual input of security codes for bridging a communications gap or providing a benefit or service to a user or the user's associated devices. Examples of security codes include secret keys used in a login or bootstrapping process as well as promotional codes or gift card identifiers used to claim a monetary benefit in an electronic commerce application, among many others. The verification of security codes may require that a user provide an issued code. Further, many verification processes are not fault-tolerant to mistakes that are commonly made by users in manually entering the security codes. The verification processes may prompt a user to reenter an erroneous code, which may ultimately frustrate some users and negatively impact their user experience.

Accordingly, it is often challenging to construct security codes in a manner that positively impacts user experience. In particular, it is often challenging to have security codes that are constructed such that the likelihood of observing a mistake in code entry is reduced.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include encoding security codes. A security code (also referred to herein as code) may comprise a plurality of symbols, whereby a symbol may be a bit, a Byte, an alphanumeric character or a punctuation mark, among many other types of symbols. Examples of the code include an ordered combination of symbols as described herein. The code may include security information or a security configuration or may be a secret key or an algorithm seed. The code may be used to bridge a communication gap between systems or facilitate transferring data to remote or disconnected devices. For example, manual entry of the code may be required to connect systems with one another or transfer data between a service and a device. The code may also be utilized for electronic commerce applications, whereby, for example, the code may identify a particular gift certificate, gift card, voucher or token, and may be used to claim or redeem a certain monetary value.

Codes may vary in length, whereby the length of the code may be a function of the total number of codes in use in a system, the total number of unique codes assigned to a set of users, and/or a number of items in the sequence required to ensure that the probability of a randomly generated code of the same length being a valid code is below some predetermined threshold. Further, when users are required to manually enter a code, the likelihood of making a mistake in entering the code increases as the size of the code increases. While some codes may be classified as error-detecting or error-correcting (i.e., the codes are constructed to enable a data processing system to identify or correct one or more mistakes in the code), such construction often comes at the expense of increased code length. Furthermore, error-detecting or error-correcting may be limited in the number or type of mistakes they are constructed to detect or correct. In the event that a user provides an erroneous code or makes a mistake in entering a code (for example, by adding symbols to the code or replacing or swapping a set of symbols with another set of symbols), a user may become frustrated at having to reattempt code entry. Further, the overall user experience in interacting with a system may be negatively affected.

Codes may be constructed based at least in part on historical manual input performance of users. A verification entity may be used to assess successful and unsuccessful instances of inputted codes. Further, an encoding algorithm may be updated to avoid problematic encoding constructions based at least in part on code verification results. Code construction may be further varied in response to user or client attributes. For example, input device properties, user profile data or other similar data that may relate a particular user to a subset of the overall user population.

The code verification entity may receive a first code from a user. The first code may be erroneously entered and rendered invalid due to the erroneous entry. The verification entity may determine whether the first code is valid. For example, the verification entity may check one or more parity bits associated with the first code to determine whether the first code is valid. Alternatively, the verification entity may at least partially decode the code to identify a decoding or encoding algorithm associated with the code. The verification entity may utilize the identified algorithm to determine whether the code is valid. Furthermore, the verification entity may consult a database of codes identified as having been issued for use. The code may be deemed as invalid if the code is determined not to belong to a set of codes of the database.

Upon determining that the first code is invalid, the verification entity may proceed to identify a potentially problematic code construction that may have contributed to inducing a user to erroneously enter the first code. The verification entity may identify a set of codes based at least in part on a distance between the first code and the set of codes. The distance may be measured using an edit distance metric or other string similarity metric, as described herein. For example, the set of codes may be different from the first code by one or more symbols. Furthermore, one or more changes made to a code of the identified set of codes may result in arriving at the first code.

Following identification of the set of codes, the verification entity may identify a portion of the first code or a portion of a code of the identified set of codes as potentially inducing erroneous code entry. The portion may be a set of symbols, whereby a portion of the set may be symbols not in common between the first code and the code of the identified set of codes. For example, the first code may be compared to each code of the identified set of codes. Based at least in part on the comparison, some symbols in common between the codes may be dispensed. However, remaining symbols may be identified as potentially inducing erroneous code entry.

It may be desired that the identified portion not be included in further codes issued for use. Accordingly, an algorithm used to generate codes may be negatively biased to disfavor issuing a second code including the identified portion of symbols. The algorithm may be instructed to reduce the likelihood associated with generating the second code including the identified portion of symbols. For example, a user may conflate the numeral '5' with the letter 'S', and, accordingly, an algorithm may be negatively biased to disfavor issuing codes including the numeral '5' and the letter 'S'. Furthermore, if it has been identified that one or more users mistakenly entered the letters 'TYT' and 'YTY' due to the proximity of the letters on a QWERTY keyboard, a penalty may be instituted for generating codes including 'TYT' and 'YTY'.

Issuing a code for use may include issuing a proof-of-work problem whose outcome is the code. Further, negatively biasing code issuance to disfavor issuing a second code including an identified portion of symbols may include negatively biasing receiving the second code including the identified portion of symbols. Proof-of-work systems may require a party to follow a procedure to generate the second code, whereby the second code may be provided to a validation entity. Accordingly, the procedure may be biased or modified so as to disfavor the second code being generated or provided for validation (for example, using an input device).

Figure 1:
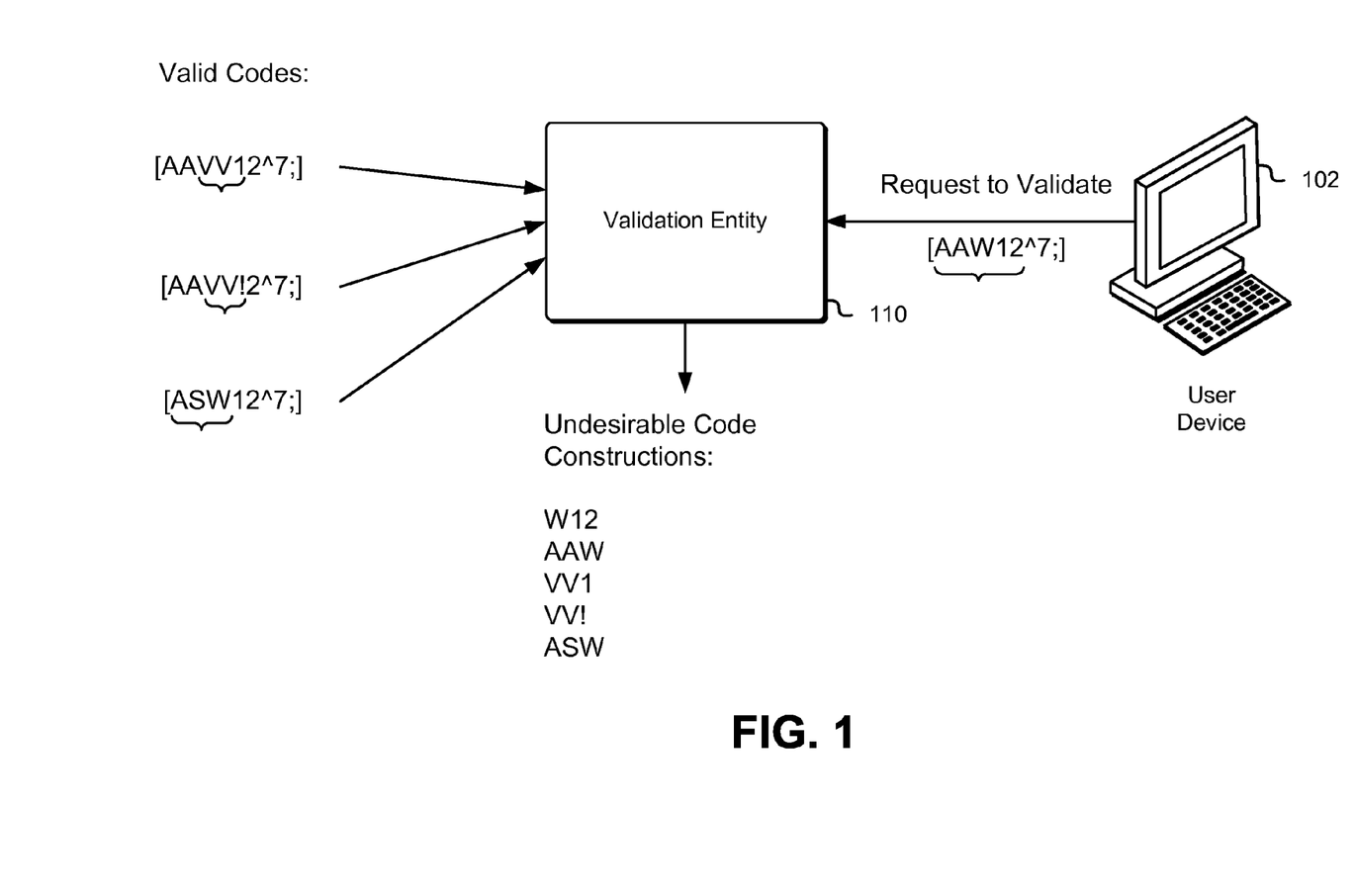
FIG. 1 shows an example of code validation in accordance with at least one embodiment.

FIG. 1 shows an example of code validation in accordance with at least one embodiment. A validation entity 110, which may be a collection of computing resources and/or other resources collectively configured to validate a code or determine one or more undesirable code constructions, receives a request to validate a code. As used herein, unless otherwise stated or clear from context, the collection of computing resources may be a computer system program, process, client, server, service, application, module, operating system entity, controlling domain or combinations of these and/or other such computer system entities. The collection of computing resources may be a client and/or a server and in some embodiments may be configured to send and/or receive communications, data, requests and/or other such requests to and/or from other services within the computer system. The request is received from a user device 102 and includes a code that is sought to be validated. The validation entity 110 determines whether the code is valid, for example, by determining whether the received code has been issued for use. If the validation entity 110 determines that the code is not valid, the validation entity may identify one or more undesirable code constructions that may have contributed to the code being erroneously entered by a user. The validation entity 110 identifies a set of valid codes, whereby the valid codes may be neighboring codes to the received code. The set of valid codes may also be within a distance of the received code, for example, as measured by a distance metric in a code space.

Upon determining the set of valid codes, the validation entity 110 evaluates the received code together with each valid code of the set of valid codes to identify the one or more code constructions. As described herein, the validation entity 110 may compare the two codes and identify the one or more code constructions based at least in part on similarities or differences between the two codes. The one or more code constructions may be a portion of the received code or a portion of a valid code of the set of valid codes. The one or more code constructions may be identified as having undesirable properties, whereby, for example, a user may mistakenly perceive one or more symbols of the code constructions or mistype the one or more symbols due to their proximity on a layout of an input device. Upon identifying the code constructions, the code constructions may be excluded from usage in future codes. Further, the generation of future codes may be biased so as to disfavor the issuing codes having the identified constructions to users.

Figure 2:
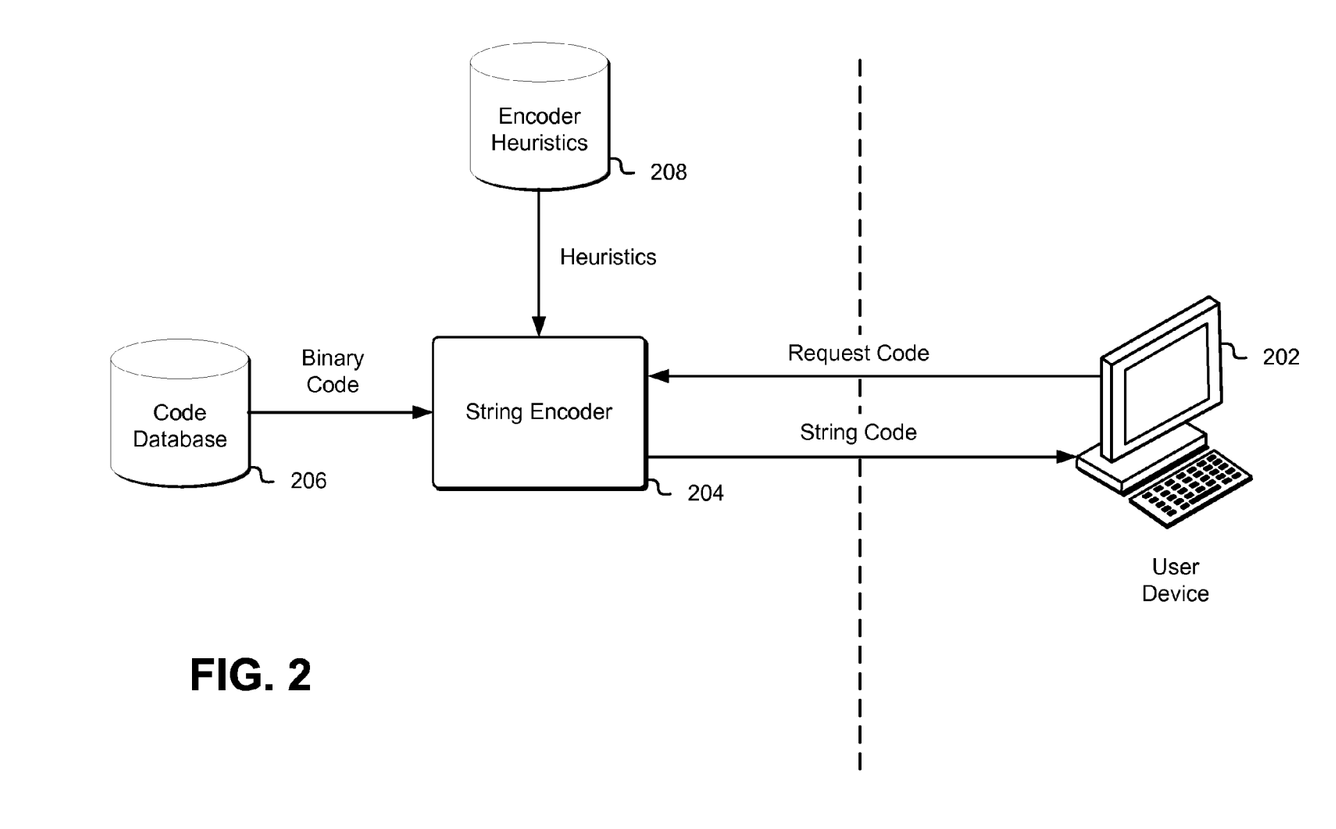
FIG. 2 shows an example of an environment for code generation in accordance with at least one embodiment.

FIG. 2 shows an example of an environment for code generation in accordance with at least one embodiment. A user device 202 requests that a code be provided to the user device. The code may comprise a string of characters (for example, alphanumeric characters, punctuation marks or symbols, among others). Further, the code may be a security code for use in authentication, such as multi-factor authentication, or as a password, such as a one-time password (OTP). For example, the code may be requested for use in accessing a service, a device or an account, among others, whereby a request for access to the service, device or account may be validated based at least in part on the provided code. In addition, the code may be used for redemption of a benefit. For example, the code may be a gift card number for use in an electronic commerce application. The code may be unique and distinguishable from other codes that are provided to the user or other users. Where the code is issued for use in validating the user, the validation may be predicated upon the fact that the user provides the code as issued and the validation may not be completed or may fail if the user were to provide a different code or a variation of the issued code. Accordingly, it may be important for the code to be distinguishable from other codes issued in a system.

The user device 202 may be any type of device that is configured to request that a code be issued for a user. Further, the user device 202 may be configured to receive a system-generated code or submit the code for validation. For example, the user device 202 may be any type of consumer electronics device including a laptop or desktop computer, a tablet, a mobile phone or a smartphone, a smart television, a set-top box or a stream player or a network-enabled digital optical disk player, such as a Blu-ray™ player or digital versatile disc (DVD™) player, among others. The user device 202 may be configured to communicate using any type of communication protocol including a cellular wireless communications protocol, such as fourth generation (4G) communications or long term evolution (LTE™), a wireless local area network (WLAN) communications protocol, such as an Institute for Electrical and Electronics Engineers (IEEE) 802.11, 802.16 or 802.21 communication protocol, or short range communications protocol, among others.

The user device 202 may be equipped with a processor, such as a central processing unit (CPU) or a graphics processing unit (GPU), that provides computing functionality to a user. Examples of a CPU include those utilizing a complex instruction set computing (CISC) architecture, such as the x86 CPU, and others that utilize a reduced instruction set computing (RISC) architecture, such as the advanced RISC machine (ARM) CPU. The user device 202 may also be equipped with one or more peripherals or integrated input devices, such as a touchscreen that responds to a fingertip or a stylus input, a physical keyboard, a digital camera, a microphone, a touchpad or a mouse, among others. Furthermore, the user device 202 may be configured with one or more applications that facilitate receiving voice inputs or voice commands from a user via the microphone or image inputs via a digital camera. In addition, the user device 202 may also be equipped with one or more output devices, output peripherals or integrated output devices, such as a screen or speakers, whereby if the user device 202 is equipped with a touchscreen, the touchscreen may service as both an input and an output device. The user device 202 may further be equipped with a global positioning system (GPS) circuitry that enables locating the device. The user device 202 may further be equipped with an operating system and may be configured to execute software applications and programs compatible with the operating systems. Although the user device 202 is described herein as a party requesting that a code be issued for a user or requesting validation of the code, any party may request that a code be issued or validated. For example, one or more services, which may be a collection of computing resource or other resources, may be configured to request the code to be issued or validated.

A string encoder 204 receives the request for issuing the code from the user device 202. The string encoder may be a collection of computing resources and/or other resources collectively configured to receive the request from the user device 202 or provide the code to the user device 202 in response to the request. As used herein, unless otherwise stated or clear from context, the collection of computing resources may be a computer system program, process, client, server, service, application, module, operating system entity, controlling domain or a combination of these and/or other such computer system entities. The collection of computing resources may be a client and/or a server and in some embodiments may be configured to send and/or receive communications, data, requests and/or other such requests to and/or from other services within the computer system.

The code provided to the user device 202 may be human-readable in that it may comprise characters that may be easily identifiable by a human operator of the user device 202. The code provided to the user device 202 is referred to herein as a string code or a transformed code due to the fact that the code may be transformed from another representation (for example, a binary representation) into a representation that is meaningful or identifiable to a human operator. For example, a human operator of the user device 202 may be less likely to make a mistake in entering a code represented as having alphanumeric characters and symbols than an equivalent code represented as binary digits.

The string encoder 204 retrieves a binary code from a code database 206 for use in generating a string code for the user. The code database 206 may retain one or more binary codes that are valid for use. The code database 206 may generate a binary code as a request for issuing the code is received. Alternatively, binary codes that may be used may be pre-generated, and a binary code from a pre-generated list may be provided to the string encoder 204. As described herein, each binary code may be unique and may be separately identifiable from other binary codes.

The string encoder 204 may transform the binary code received from the code database 206 to a string code to be provided to the user device 202. Any type of transformation may be employed by the string encoder 204 to transform the binary code. For example, the string encoder 204 may transform the binary code to hexadecimal representation to produce the string code. Accordingly, if the binary code is '11100111', the string code in hexadecimal representation will be 'E7'.

The string encoder 204 may further utilize encoder heuristics 208 in generating the string code based at least in part on the binary code. Heuristics may be self-evaluating or self-educating techniques for obtaining a solution based at least in part on observations. The heuristics may place limitations on or penalize generating certain string codes that may potentially be mistakenly entered by a user requesting validation based at least in part on the string code. Further, the heuristics may favor the generation of codes that are not observed to cause confusion to a user entering the code on the user device 202. The heuristics may be established or formulated based at least in part on observed mistakes or errors in codes that are provided for validation as described herein. For example, when a user provides a code for validation, an error made by the user in entering the code may be observed. Further, a feature, attribute or aspect of the code that contributed to or induced the error may be identified.

The heuristics may penalize future generation of codes having the identified feature, attribute or aspect by the string encoder 204 or future transformations of binary codes into string codes that have the identified feature, attribute or aspect by the string encoder 204. For example, if it has been determined that users who enter a string code for validation with a user device 202 having a touchscreen input peripheral commonly interchange the letters 'E' and 'F' or the symbol '@' with the letter '2', the heuristics may penalize the string encoder 204 from generating string codes including the features. As error-inducing codes or portions thereof are identified, a numeric penalty may be associated with the code or portion. Upon generating a new code, the new code may be evaluated to determine the penalty associated with the code. The penalty may be a function of the penalties associated with the various portions of the code, whereby, for example, the penalty may be the sum of the penalties associated with the various portions of the code. If the penalty associated with the code is found to exceed a threshold, the code may not be employed or provided for use. In another embodiment, a distribution associating various code segments with probabilities of issuing the code segments may be used. The probabilities may be updated in accordance with encoding heuristics and the distribution may be used when constructing codes, whereby if the probability associated with a code segment outside a specified range, the code segment may not be used in code construction.

Following receipt of the request to issue the code, the string encoder 204 transforms the binary code retrieved from the code database 206 in accordance with the heuristics received from the encoder heuristics 208 to produce the string code. The string encoder 204 then provides the string code to the user device 202.

Figure 3:
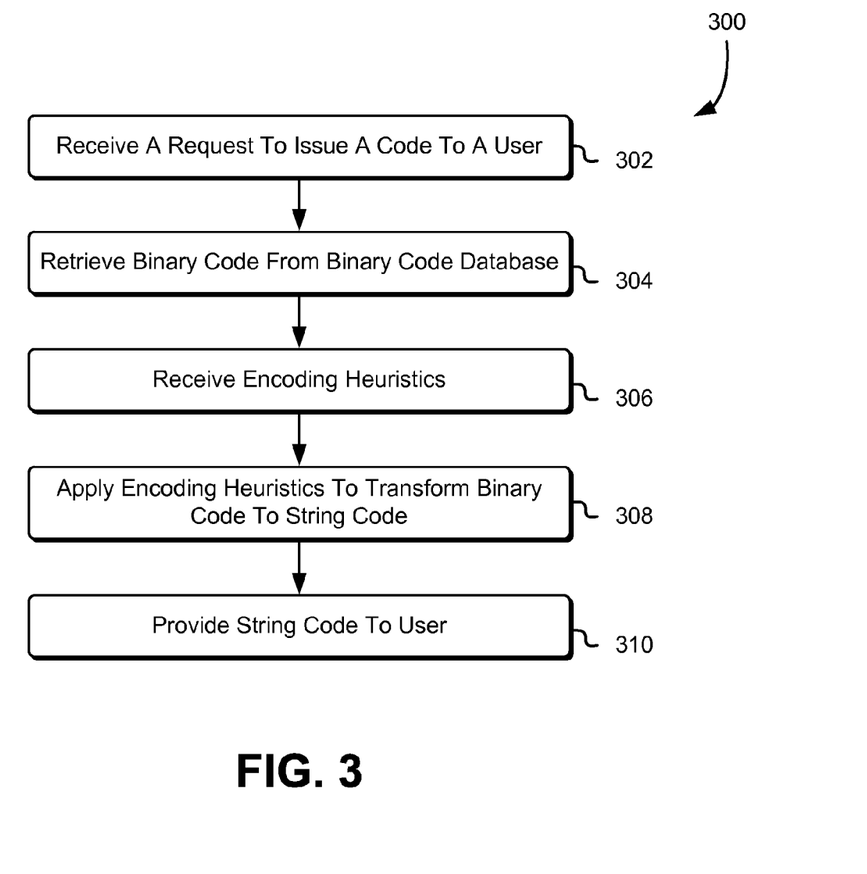
FIG. 3 shows an example of a method for providing a string code in accordance with at least one embodiment.

FIG. 3 shows an example of a method for providing a string code in accordance with at least one embodiment. A string encoder, such as the string encoder described with reference to numeral 204 in FIG. 2, receives 302 a request to issue a code to a user. The string encoder retrieves 304 a binary code from a binary code database, such as the code database described with reference to numeral 206 in FIG. 2. The string encoder then receives 306 encoding heuristics for use in transforming the binary code to a string code. The string code may more compactly represent the binary code, for example, in terms of the number of symbols used. Further, the string code may be more convenient to enter by a user when code validation is required as the string code may more compactly represent information than the binary code. As described herein, the encoding heuristics may place limits on or penalize generating certain string codes that are prone to entry errors. It is noted that by excluding usage of some string codes or string codes features or properties, the encoding heuristics may narrow the available code space and may require longer string codes to be used to transform a binary code.

The string encoder then applies 308 the encoding heuristics to transform the binary code to a string code as described herein. Further, the string encoder provides 310 the string code to the user in response to the request. It is noted that in alternative embodiments, the encoding heuristics may alternatively be used to bias the generation of binary codes towards more favorable codes. For example, a binary code may be transformed to a string code in accordance with a specified transformation function. The encoding heuristics may be applied to binary code generation, whereby the generated binary code when transformed (for example, using a transformation function) results in a string code having desired properties or lacking certain undesired properties as appropriate.

Following providing the string code to the user, the user may seek to use the string code, for example, as part of an application request. The string code may encode security information, such as encoded data for a security configuration, a secret key, an algorithm seed or bootstrap data, among others. The security code may be manually entered by a user via a user device as described herein. For example, the user may utilize a keyboard or a touchscreen to enter the security code. Further, the security code may be printed or transcribed and may be entered by being captured by a digital camera of the user device. The user device may submit a request to validate the string code, whereby upon validation, one or more actions may be performed, such as authenticating the user for access to a service.

Figure 4:
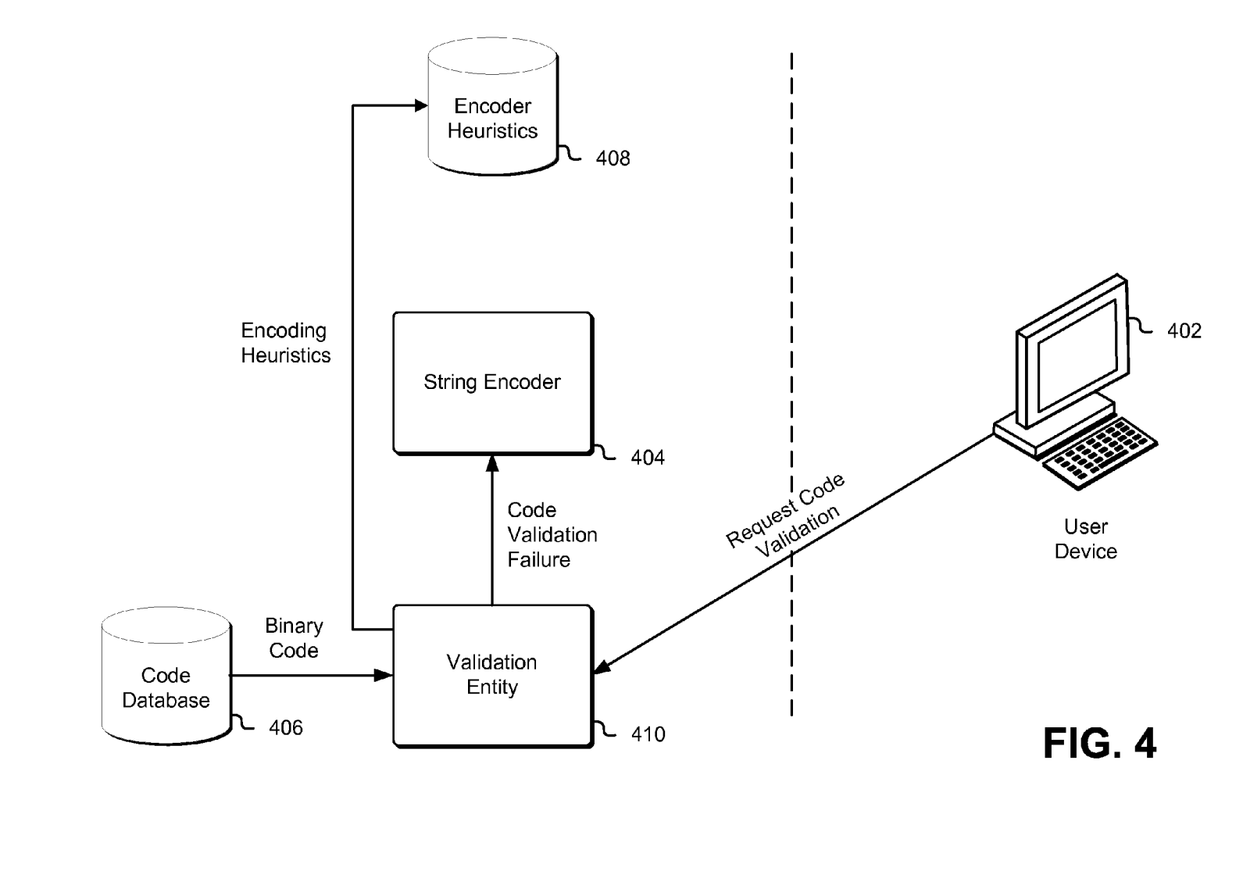
FIG. 4 shows an example of an environment for code validation in accordance with at least one embodiment.

FIG. 4 shows an example of an environment for code validation in accordance with at least one embodiment. A user device 402 submits a request to validate a code to a validation entity 410. The user device 402 may be any type of consumer electronic device, such as the user device described with reference to numeral 202 in FIG. 2. The request may include a code entered by a user. The code may be entered correctly or erroneously. An erroneously entered code may include additional characters, symbols or pieces or portions of the code or may be missing a character, symbol or piece or portion of the code. Further, the erroneous code may be of the same size as an issued code but may have one or more characters that do not match those of the issued code. For example, if characters of a code are mistyped or swapped upon entry, the resultant code is erroneous.

Erroneous entry of the code may be due to pitfalls associated with certain code features or user device input peripherals or integrated input devices. For example, a human operator of a user device may interpret or falsely perceive two adjacent 'V' letters in a code as the letter 'W' and may, accordingly, enter the letter. Similarly, a camera may falsely capture the letters. Furthermore, the numbers '0' and '1' may be confused with the letters 'o' and 'i', respectively. In addition, certain keyboard or keypad layouts may induce operators to mistype certain characters or symbols. For example, due to a QWERTY keyboard layout, operators may interchange the letters 'm' and 'n' or 't' and 'y', which are adjacent in the layout. Additional error-prone codes may be discovered based at least in part on identified error prone codes. For example, codes including adjacent characters in a QWERTY layout may be deemed as undesirable due at least in part to potential swapping of the characters.

Upon receiving the request to validate the code, the validation entity 410 may evaluate the code to determine whether the code is valid. A valid code may be a code for which a corresponding code has been issued by the code database 406 or for which a corresponding code is retained by the code database 406. For example, a valid code may be identical to a code retained or issued by the code database 406. As described herein, the code database 406 may retain a record of all valid codes or all issued codes. The code received with the request may be compared with one or more retained records and a determination may be made as to whether the code is valid.

If the code is determined to be invalid, a notification may be sent to the user device 402 and the user may be requested to provide a valid code or reenter the code. The notification may be sent over a network, whereby the network may be a public network, such as the Internet, or a private network. Further, a notification of a code validation failure may be sent to the string encoder 404. The erroneous code may also be compared with one or more codes (for example, string codes issued by the string encoder 404) to identify a set of codes having an edit distance that is within a threshold to the invalid code. Alternatively, the validation entity 410 may identify a specified number of codes that are closest to the invalid code as measured by a distance metric. Identifying the set of codes may be based at least in part on both factors as used in unison. For example, the set of codes may be the specified number of codes that are closest to the invalid code and are within the specified distance range of the invalid code. One or more of the identified codes may have been incorrectly entered as the invalid code. Differences or similarities between the received code and the identified codes or features or properties of the codes may be used to construct or update encoding heuristics. Further, attributes associated with a user or a user device may also be used to construct or update encoding heuristics.

As described herein, encoding heuristics may be provided to a party requesting authentication and may be used to bias against code generation by the party. Accordingly, the encoding heuristics may be used to bias against receiving a code having certain properties, such as a symbol pattern. Furthermore, in proof-of-work systems the advertisement of a proof-of-work problem may be biased so as to disfavor having a resulting code as an outcome, whereby the resulting code has the symbol pattern. Accordingly, if the resulting code is manually entered by a user, certain code constructions having undesirable properties may be avoided. Furthermore, biasing code issuance may include biasing a reward issuance in a proof-of-work system or other system based at least in part on the code.

Due to the fact that codes that are issued by the string encoder 404 based at least in part on encoding heuristics are expected to be submitted for validation (for example, at a later point in time), biasing the issuance of a code or controlling a construction of an issued code as described herein is equivalent to biasing receiving a code with certain properties or controlling a construction of a received code.

Figure 5:
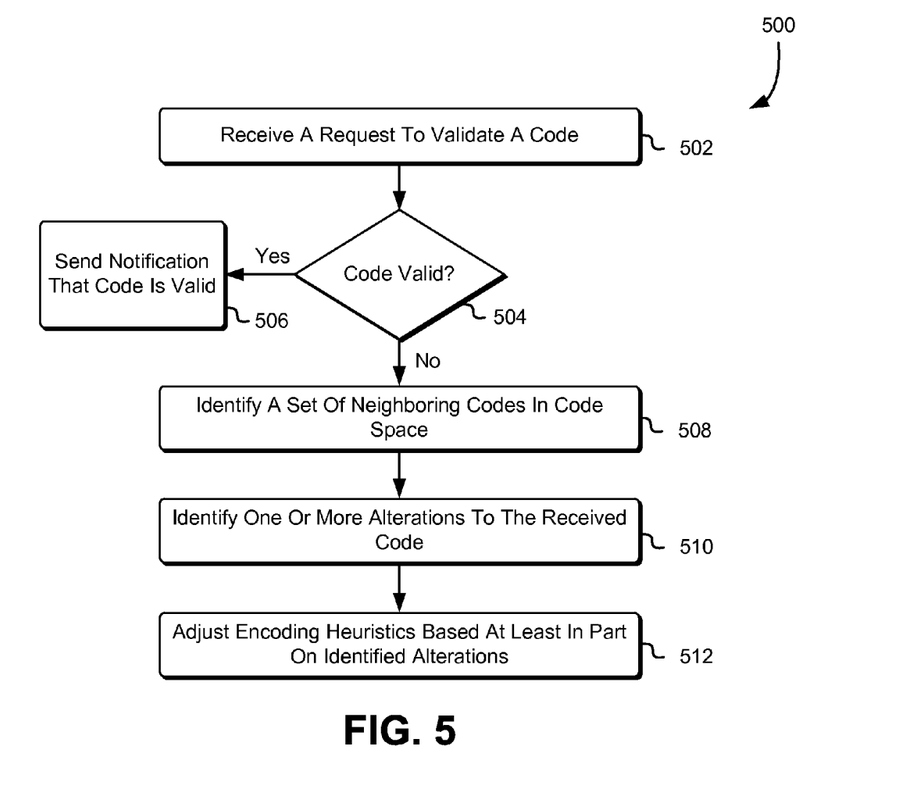
FIG. 5 shows an example of a method for code validation in accordance with at least one embodiment.

FIG. 5 shows an example of a method for code validation in accordance with at least one embodiment. In the process 500, a validation entity, such as the validation entity described with reference to numeral 410 in FIG. 4, receives 502 a request to validate a code. The request to validate the code includes the code sought to be validated, whereby the code may be correctly or erroneously reproduced, transcribed or deciphered from an issued code. The validation entity then determines 504 whether the received code is valid. Determining whether the received code is valid may include evaluating whether the received code corresponds to at least one code retained in a code storage system, such as the code database described with reference to numeral 406 in FIG. 4. The code storage system may be a database that includes all valid codes (for example, codes issued to users) and a code may correspond to a retained code if the code matches a code in the database.

In various embodiments, a code may include information usable for determining whether the code is valid. For example, a generation identifier may be encoded in a string code, whereby the generation identifier may be used to identify a particular algorithm used for generating the code. The code may be checked to determine validity based at least in part on the generation identifier. Upon determining that the received code is valid, the validation entity sends 506 a notification indicating that the code is valid. The notification may be sent to a party or service for which code validation was requested. For example, if the validated code was a promotional code or a redemption code in an electronic commerce application, the notification may be sent to a payment system of the electronic commerce application.

Upon determining that the received code is invalid, the validation entity then identifies 508 a set of neighboring codes to the received code in a code space. Each neighboring code of the set of neighboring codes may be within a distance as measured by a distance metric to the received code. Examples of the code space include an n-dimensional space for an n-length code as described with reference to FIG. 6 herein. The distance between two points may be a function of the likelihood of a character or symbol substitution to occur, whereby, for example, the distance may be inversely proportional to the likelihood of a substitution of characters. A likelihood function may be used to approximate the likelihood of symbol substitution, which may be based on observed user behavior. The set of codes may be identified by selecting one or more of the closest m codes to the received code, where m is an integer. Alternatively, the set of codes may be identified by selecting one or more codes having a distance to the received code that is below a threshold.

The validation entity then identifies 510 one or more alterations to the received code based at least in part on the identified set of neighboring codes. As described herein, an alternation may be one or more edits made to a member of the identified set of codes resulting in the received code. The alteration may be a substitution or swap to one or more characters of a member of the identified set of codes. The alteration may be due to a problematic code construction in one or more codes of the identified set, whereby the code construction may induce the alteration or may cause users to erroneously enter the code. The validation entity then adjusts 512 encoding heuristics based at least in part on the identified alterations. For example, the validation entity may adjust the encoding of string codes so as to bias against or disfavor generating string codes having a similar construction.

Figure 6:
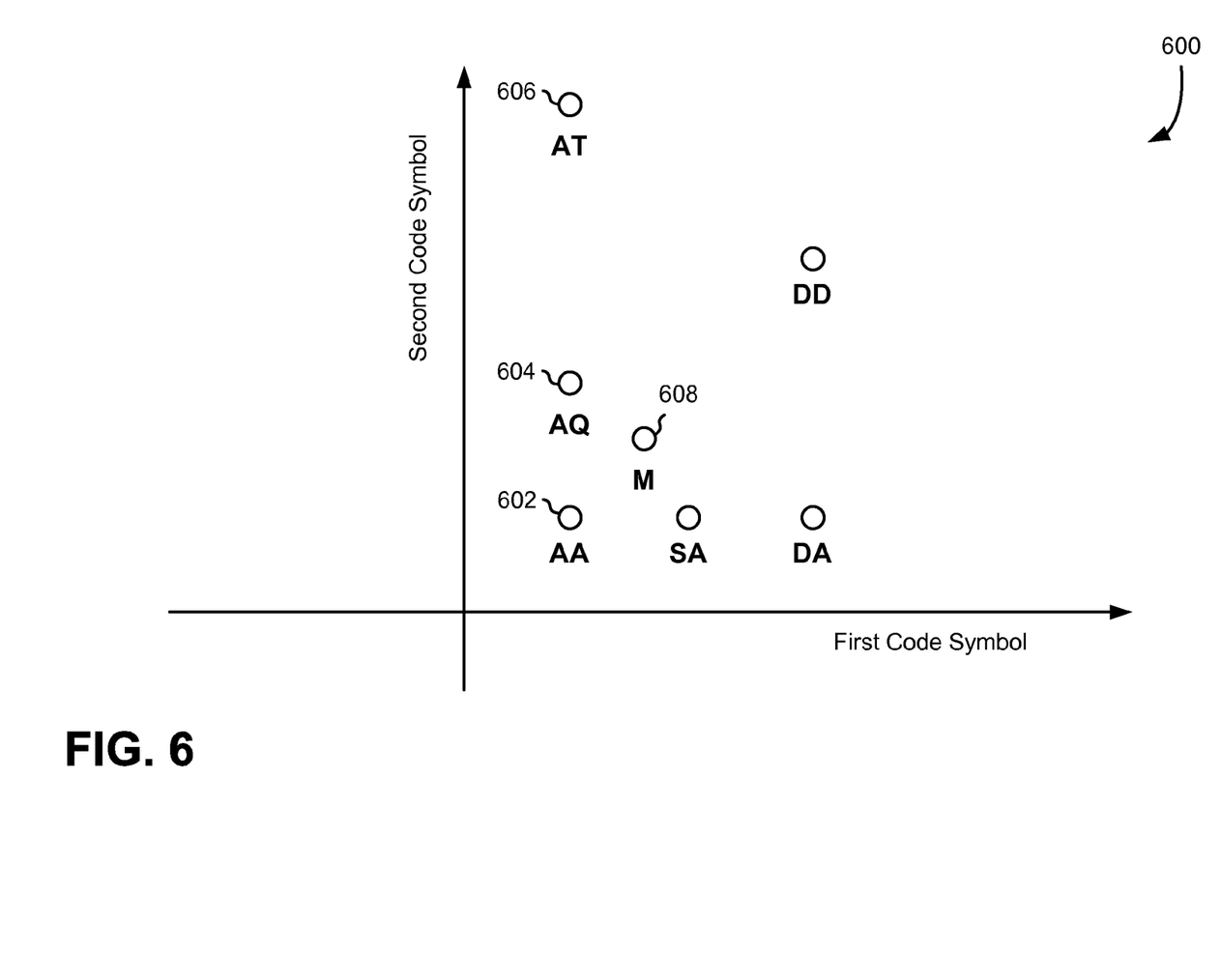
FIG. 6 shows a representation of an example of a code space in accordance with at least one embodiment.

FIG. 6 shows a representation of an example of a code space in accordance with at least one embodiment. The code space 600 is two-dimensional, whereby a first dimension pertains to a first symbol of the code and a second dimension pertains to a second symbol of the code. A point in the two-dimensional code space 600 corresponds to a two-symbol code and the distance between any two points is a function of the likelihood of substituting one or both symbols of the first code with one or both symbols of the second code. The distances are based at least in part on the likelihood of symbol substitution using a QWERTY keyboard. It is noted that for other types of input devices, the placement or distance between the various codes may be different.

For example, the distance between the code 'AA' 602 and the code 'AQ' 604 is a function of the likelihood of substituting the second symbol of the code 'AA' 602 to produce the code 'AQ' 604 using a QWERTY keyboard. The code 'AA' 602 may be close in the code space 600 to the code 'AQ' 604 because the letters 'A' and 'Q' are neighbors in a QWERTY layout. Accordingly, there may be a higher likelihood of a user inadvertently entering the code 'AQ' 604 as the code 'AA' 602 than the user inadvertently entering the code 'AT' 604 as the code 'AA' 602 due to the fact that the letter 'T' is farther away from the letter 'A' in a QWERTY layout. Similarly, the code 'M' 608 may be close to the code 'AA' 602 due to the fact that a user may incorrectly perceive 'AA' as 'M'.

The closer the distance between two codes in the code space 600, the higher is the likelihood that a user error (for example, symbol substitution, omission or addition) causes a first code (for example, the identified neighboring code) to be entered as the second code (for example, the received code erroneously entered by the user). The distance metric may be based at least in part on attributes associated with users or devices, among others. As described herein, the character layout of keyboards, touchscreens or other input devices may be used to determine the calculation of the distance. In addition, user profile information, such as user language, a preferred written language of the user, user location or a type of human interface device used by the user, may also be used to determine the distance. For example, English-speaking users may be more likely to conflate certain characters or symbols than French or German speaking users.

Following identifying the set of codes having a specific edit distance to the erroneous code, the encoding heuristics may be updated to penalize or disfavor issuing codes to users having certain features or code construction attributes, such as those observed in the identified set of codes or the erroneous set of codes. Making reference to FIG. 6, issuing the code 'AA' 602, 'AQ' 604 and 'M' 608 may be penalized, whereas issuing the code 'AT' 606 may not be penalized. Penalizing the generation of such codes results in excluding codes having features observed to cause the codes to be erroneously entered for validation. The penalizing further limits the space of issued codes to those that do not have such undesirable properties.

Due to the fact that users having similar attributes may be expected to make similar mistakes in entering codes for validation, encoding heuristics may further be used to penalize or disfavor issuing codes with certain features based at least in part on user attributes. For example, if one or more users have been observed to make mistakes with respect a certain code feature, there may be an additional penalty associated with issuing, to a similar user, a code with the same or similar code feature. The similar user may be a user having attributes that are in common with the one or more users. User attributes may include a keyboard layout of the user, a preferred written language of the user or a location of the user, among others. Further, user attributes may also include attributes of a user device, such as a type of human interface of the user device. For example, the human interface of the user device may be a keyboard, touchscreen, keypad or gesture-based input device. For instance, if keyboard users are identified to conflate the characters 'TY' with 'YT' in certain codes, there may be an additional penalty associated with issuing a code including the characters 'TY' or 'YT' to a user that is known to be a keyboard user. This penalty may, for example, be larger than the penalty associated with issuing the same code to a user that is identified as using a smartphone-based digital camera application in capturing a printed code.

Figure 7:
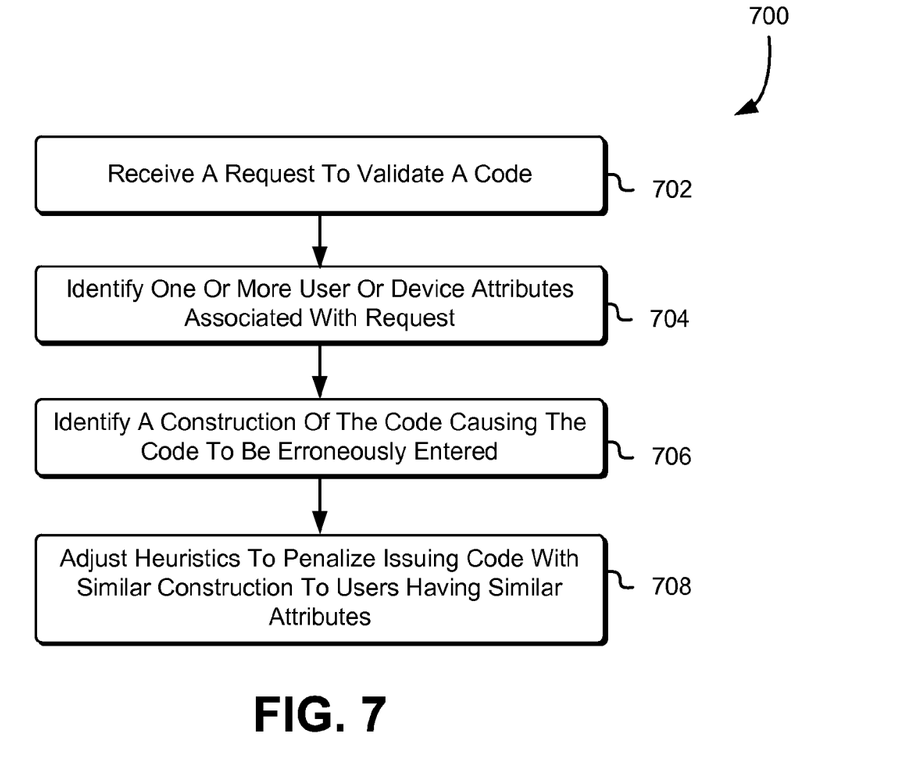
FIG. 7 shows an example of a method for adjusting encoding heuristics in accordance with at least one embodiment.

FIG. 7 shows an example of a method for adjusting encoding heuristics in accordance with at least one embodiment. In the process 700, a validation entity receives 702 a request to validate a code. The request to validate the code may be an application request, such as a login request, and the code may be part of security information, such as a secret key or an algorithm seed. The validation entity then identifies 704 one or more user or device attributes associated with the received request. For example, the one or more user or device attributes may be identified based at least in part on a header of the application request or a retained profile of a user submitting the request. The validation entity then identifies 706 a construction of the code that causes the received code to be erroneously entered. As described herein, the construction may be one or more symbols of the code or a portion of the code. Further, the construction of the code may be identified by first comparing the received code to a valid code that is within an edit distance of the received or invalid code. The comparison may yield that a first portion of the codes are identical or in common with one another, whereas a difference may exist between a second portion of the received code and the valid code. Utilizing the assumption that the valid code had been issued to the user and mistakenly entered by the user, the second portion of the valid code may be identified as a construction that leads to erroneous entry. The validation entity then adjusts 708 heuristics to penalize issuing a code with similar construction to users having similar user or device attributes as that of the user from which the erroneous code is received.

The techniques described herein may be applicable to any type of code. While human-readable codes are used for illustration, the codes described herein may also be non-human-readable, such as bar codes or quick response (QR) codes. For example, certain non-human readable codes may be prone to error and certain attributes of the non-human readable code may contribute to inducing various errors upon entry. For example, certain bar codes may be erroneously entered due to the fact that a scanner may not have a high resolution. Further, the techniques are applicable to any context where the transport of codes (for example, from first form to a second form) has the potential of error, such as due to the transmission of codes over a noisy channel. In addition, voice-based codes that require a user to vocally enter a code through a microphone may also be generated in accordance with the embodiments described herein. Furthermore, accelerometer-based inputs that may require a user to motion or wave a smartphone, tablet or other device may be also be subject to being generated in accordance with the embodiments described herein. For example, certain error-prone voice-based inputs or motions may be avoided to reduce the likelihood of a user-based error. The embodiments described herein may be applicable in any way of providing information using one or more input devices that can be prone to error when entered.

Figure 8:
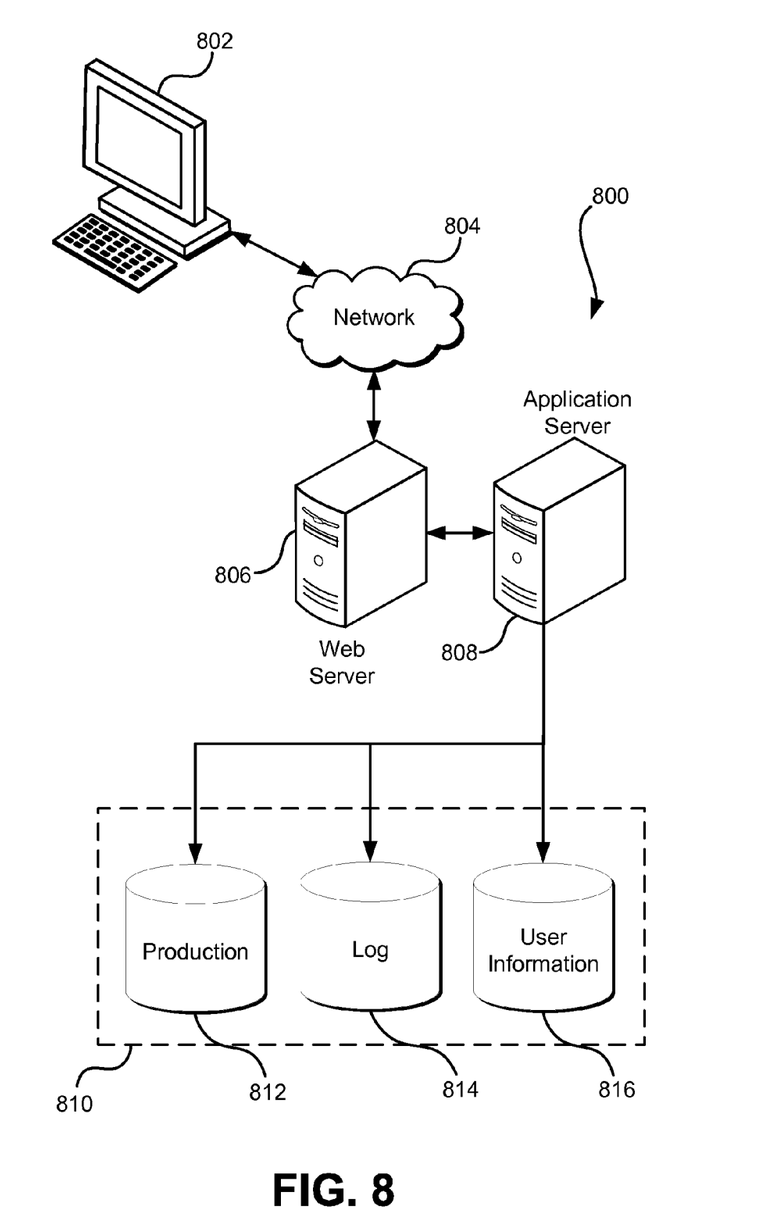
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP:

Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving a code for validation, the received code comprising a plurality of symbols;
   determining whether the received code is valid, the received code being valid on a condition that the received code is identified as having been issued for use; and
   on a condition that the received code is not valid:
     identifying a set of valid codes within a code space of the received code;
     comparing the received code with a first code of the set of valid codes to identify a portion of the first code having a symbol pattern;
     updating one or more encoding heuristics to bias against providing a second code having one or more symbols matching the symbol pattern;
     using the one or more encoding heuristics to generate a set of codes;
     using at least a subset of the set of codes for validation; and
     accessing, based at least in part on the subset of the set of codes being valid, one or more computing services.

2. The computer-implemented method of claim 1, further comprising:
   determining that the at least one code is valid due at least in part to the at least one code being a member of the subset of codes.

3. The computer-implemented method of claim 1, wherein a valid code of the set of valid codes is within a distance of the received code.

4. The computer-implemented method of claim 3, wherein the distance is an edit distance that is proportional to a number of symbol substitutions required to be made to the valid code to produce the received code.

5. The computer-implemented method of claim 3, wherein the distance is inversely proportional to a likelihood that the valid code is erroneously entered as the received code.

6. A system, comprising:
   one or more processors; and
   memory to store executable instructions that, if executed by the one or more processors, cause the system to:
     receive a first code;
     compare the first code to a set of valid codes to identify, for at least one valid code of the set of valid codes, a portion of symbols;
     construct heuristics usable to bias against receiving the portion of symbols in a second code; and
     in response to validating at least a subset of the second code, access one or more computing services.

7. The system of claim 6, wherein the instructions further cause the system to:
   receive a request to issue the second code; and
   in response to the request, issue the code in accordance with the constructed heuristics.

8. The system of claim 6, wherein the instructions further cause the system to identify the at least one valid code of the set of valid codes based at least in part on a distance between the at least one valid code of the set of valid codes and the first code.

9. The system of claim 8, wherein the distance is inversely proportional to a likelihood that the at least one valid code of the set of valid codes is erroneously entered as the first code.

10. The system of claim 6, wherein:
    receiving the first code further includes receiving the first code from a first user; and
    the instructions further cause the system to identify one or more attributes associated with the first user.

11. The system of claim 10, wherein constructing the heuristics further includes negatively biasing receiving a code having the portion of symbols from a second user having at least some of the one or more attributes in common with the first user.

12. The system of claim 10, wherein the one or more attributes include a type of interface device, a preferred written language, a location or a keyboard layout.

13. The system of claim 6, wherein a valid code of the set of valid codes is identified based at least in part on the valid code of the set of valid codes having been issued for use.

14. A non-transitory computer-readable storage medium having collectively stored thereon executable instructions that, if executed by one or more processors of a computer system, cause the computer system to:
    for a first code, identify a set of neighboring codes in a code space;
    determine, based at least in part on comparing the first code to at least one code of the set of neighboring codes, a code portion comprising one or more symbols;
    cause a likelihood associated with issuing a second code including the code portion to be updated to negatively bias providing the second code;
    use at least a subset of the second code for validation; and
    in response to the validation, access one or more computing services.

15. The non-transitory computer-readable storage medium of claim 14, wherein the instructions that cause the computer system to identify the set of neighboring codes further include instructions that cause the computer system to:
    calculate, for each code of the set of neighboring codes, a distance between the first code and the code of the set of neighboring codes; and
    select the code of the set of neighboring codes as a member of the set of neighboring codes on a condition that the distance is within a threshold.

16. The non-transitory computer-readable storage medium of claim 15, wherein the distance is an edit distance between the first code and the code of the set of neighboring codes.

17. The non-transitory computer-readable storage medium of claim 14, wherein the instructions that cause the computer system to identify the set of neighboring codes further include instructions that cause the computer system to include a neighboring code in the set of neighboring codes on a condition that a number of members of the set of neighboring codes is within a limit on the number of members.

18. The non-transitory computer-readable storage medium of claim 14, wherein the instructions further comprise instructions that, if executed by the one or more processors, cause the computer system to identify one or more attributes associated with a first user of the first code.

19. The non-transitory computer-readable storage medium of claim 18, wherein the instructions that cause the computer system to cause the likelihood associated with issuing the second code including the code portion to be updated to negatively bias issuing the second code further include instructions that cause the computer system to cause the likelihood to be updated to negatively bias issuing the second code to a second user having at least some of the one or more attributes in common with the first user.

20. The non-transitory computer-readable storage medium of claim 18, wherein the one or more attributes include a type of interface device, a preferred written language, a location or a keyboard layout.

21. The non-transitory computer-readable storage medium of claim 14, wherein:
the first code is erroneously entered due at least in part to substitution, addition or removal of a symbol of the code portion; and
the code portion is identified as contributing to inducing the erroneous entry of the first code.

22. The non-transitory computer-readable storage medium of claim 14, wherein the instructions further comprise instructions that, if executed by the one or more processors, cause the computer system to:
receive a request to issue the second code; and
issue the second code in accordance with the updated likelihood.

* * * * *